(12) United States Patent
Bellandi

(10) Patent No.: US 11,260,541 B2
(45) Date of Patent: Mar. 1, 2022

(54) GRIPPER FOR INDUSTRIAL MANIPULATORS

(71) Applicant: GIMATIC S.R.L., Roncadelle (IT)

(72) Inventor: Giuseppe Bellandi, Roncadelle (IT)

(73) Assignee: GIMATIC S.R.L, Roncadelle (IT)

( * ) Notice: Subject to any disclaimer, the term of this patent is extended or adjusted under 35 U.S.C. 154(b) by 136 days.

(21) Appl. No.: 16/801,356

(22) Filed: Feb. 26, 2020

(65) Prior Publication Data
US 2020/0276718 A1 Sep. 3, 2020

(30) Foreign Application Priority Data
Mar. 1, 2019 (IT) .................. 102019000003031

(51) Int. Cl.
*B25J 15/02* (2006.01)
*B25J 15/08* (2006.01)

(52) U.S. Cl.
CPC .......... *B25J 15/028* (2013.01); *B25J 15/083* (2013.01)

(58) Field of Classification Search
CPC .............................. B25J 15/028; B25J 15/083
See application file for complete search history.

(56) References Cited

U.S. PATENT DOCUMENTS

| 6,048,013 A * | 4/2000 | Moilanen | B25B 5/087 294/116 |
|---|---|---|---|
| 6,691,860 B2 | 2/2004 | Osterfeld et al. | |
| 6,817,466 B2 * | 11/2004 | Osterfeld | B01D 29/111 198/418.2 |
| 6,852,184 B2 * | 2/2005 | Osterfeld | B01D 29/111 156/69 |
| 7,976,087 B2 * | 7/2011 | Maffeis | B25J 15/028 294/207 |

FOREIGN PATENT DOCUMENTS

| JP | 06031673 A | * | 2/1994 |
|---|---|---|---|
| JP | H06 31673 A | | 2/1994 |

* cited by examiner

*Primary Examiner* — Gerald McClain
(74) *Attorney, Agent, or Firm* — Volpe Koenig

(57) ABSTRACT

A gripper for industrial manipulators includes: at least two jaws one of which being movable allowing it to be opened and closed; and a gripper body. A first gripper body portion housing an actuator device and a second portion supporting the jaws and at least one pin element, defining a pivot axis of the movable jaw, or a pivot axis of at least one transmission element operatively interposed between the at least one movable jaw and the actuator device. The gripper arranged so that the pin element also acts as a locking pin to firmly lock together the first and second portions of the gripper body in assembled condition. The pin element having a circumferential groove which allows a snap coupling of the first portion and the second portion of the gripper body: an elastic element separating them and engaging the edge of one of the two in the groove.

11 Claims, 5 Drawing Sheets

GRIPPER FOR INDUSTRIAL MANIPULATORS

INCORPORATION BY REFERENCE

The present application claims benefit to Italian Patent Application No. 102019000003031 filed Mar. 1, 2019, the entire contents of which are incorporated by reference herein as if fully set forth.

FIELD OF THE INVENTION

This invention relates to a gripper for industrial manipulators, in particular a pneumatically operated linear or angular gripper.

BACKGROUND

In the field of industrial automation, it is known the use of robotic manipulators usually having a gripper combined therewith to grip the objects to be manipulated.

Grippers for industrial manipulators are generally provided with two or more jaws, or gripper fingers, mounted on a gripper body. The jaws can be moved away from or closer to each other between an open position, or releasing position, in which they do not apply any pressure on the workpiece to be manipulated, and a closed position, or gripping position, in which they apply to the workpiece to be manipulated sufficient pressure to ensure that the workpiece is not accidentally released during its handling.

Depending on the type of jaw movement, a distinction is made between linear grippers, in which the jaws move linearly in or on their respective guides, and angular grippers, in which the jaws pivot around respective pivot axes.

The jaws are moved by means of an actuator device housed inside the gripper body, usually of pneumatic, hydraulic, or electric type.

Typically, to allow the jaws and the actuator device to be mounted on/into the gripper body, the latter is made in two or more parts that can be assembled together by screws, adhesive substances, brackets, etc.

The functional performances of known grippers are generally satisfactory; however, they often have a relatively large number of components to be assembled and of connecting or fixing elements. This has a negative impact on the operations and assembly time of the gripper and, as a result, on the manufacturing costs thereof.

SUMMARY

Object of the present invention is to provide a gripper for industrial manipulators of the type described above, having an improved structure, in particular a structure that allows easier and faster assembling of the components and, consequently, a more economical manufacture with respect to known grippers of the same type.

This object is achieved by means of a gripper for industrial manipulator according to the independent claim. Preferred aspects of this gripper are the subject of the respective dependent claims.

In particular, the invention concerns a gripper for industrial manipulators comprising:
  at least two jaws, at least one of the two jaws being movable in order to cause the gripper to be opened and closed;
  a gripper body comprising two portions which can be removably assembled to each other, wherein a first portion is intended to at least partially house an actuator device of the gripper and a second portion is intended to support the at least two jaws, and
  at least one pin element, which
    defines a pivot axis of the at least one movable jaw, or
    defines a pivot axis of at least one transmission element operatively interposed between the at least one movable jaw and the actuator device.

The at least one pin element also acts as a locking pin to lock together the first portion and the second portion of the gripper body in assembled condition.

By using the same pin element either as a pivot pin for the at least one movable jaw or for a transmission element interposed between the jaw and the actuator device, or as a locking pin between the first and second portions of the gripper body, it is possible to do without dedicated locking means to ensure stable locking of the two portions of the gripper body, e.g. screws, brackets, adhesive substances, etc.

The at least one pin element has at least one circumferential groove and, in an assembled condition of the gripper, this circumferential groove engages a contact edge formed either in the second portion of the gripper body or in a supporting element of the at least one transmission element. The above described engagement occurs under the action of a preloading elastic force acting perpendicularly to the said pivot axes; the elastic force is generated by preloading elastic means prearranged in the gripper body so as to force the first portion and the second portion of the gripper body to reciprocally move away from each other.

Advantageously, when the circumferential groove engages the contact edge formed either in the second portion of the gripper body, or in a component housed inside the gripper body, the above-described undercut is obtained. The at least one pin element is thus firmly locked in the gripper body and cannot inadvertently slip out of it, even partially. All this takes place automatically, by snapping, under the action of the preloading force, when the pin element is fully inserted into the gripper body.

Thanks to this snap coupling, the pin element remains locked without any possibility of slipping out thereby ensuring that the gripper remains correctly assembled even during use.

The above-described structure of the gripper of the invention has two advantages: on the one hand, the overall number of gripper components is reduced and, on the other hand, the assembling process is made simpler and faster, since the assembling of the pivot pin of either the at least one movable jaw or of the transmission element in the gripper body and the locking of the two assembled portions of the gripper body can be carried out at the same time by the assembly technician.

The assembling is simplified and sped up also because the manipulation of relatively small-sized connecting elements, such as screws, nuts, washers, etc., is avoided or reduced.

Furthermore, the assembling of the gripper of the invention, and in particular the insertion of the pin element in respective seats, can be carried out completely without the use of tools such as screwdriver devices.

All the aforesaid aspects contribute to advantageously reduce the manufacturing costs of the gripper of the invention, which can therefore be marketed at lower unit prices with respect to the grippers of the known art which are similar in the matter of operation and performance.

Preferably, in an assembled condition of the gripper, the at least one pin element creates an undercut with at least one of the two portions of the gripper body or with a component housed inside the gripper body.

This way, the at least one pin element is advantageously firmly locked in its seat so that it does not inadvertently slip out of the seat. Thanks to the undercut coupling, this result is achieved without the need to rivet or deform the at least one pin element itself by means of presses or vises, thus considerably favoring the assembling simplicity and speed of the gripper.

Preferably, in order to allow the insertion of the at least one pin element, the first portion of the gripper body comprises at least one first through-hole having a respective central axis and the second portion of the gripper body comprises at least one second through-hole having a respective central axis, and in an assembled condition of the first portion and the second portion of the gripper body, said central axes of the at least one first through-hole and at least one second through-hole are aligned, or can be aligned, with each other and with one of said pivot axes.

Preferably, the gripper is designed so that the alignment of the aforesaid axes is achieved when the respective coupling surfaces of the first and second portions of the gripper body mutually come into abutment. If there are no preloading forces acting between the first and the second portions of the gripper body, this condition is achieved by simply bringing the portions of the gripper body closer to each other, e.g. by manually bringing them closer to each other. In the event that preloading elastic means are interposed between the first and second portions of the gripper body thus generating a preloading force that forces these portions to move mutually away from each other, the abutment condition between the coupling surfaces, and therefore the alignment of the axes, can be obtained dynamically, by temporarily applying on the portions of the gripper body assembled but not yet locked a force in the opposite direction with respect to the preloading force.

In practice, the gripper can be assembled manually, by bringing the two portions of the gripper body closer, overcoming the thrust exerted by the preloading elastic means, up to the achievement of the alignment of the holes in which the pin elements are inserted. By releasing the two gripper portions, the preloading elastic means cause the two portions of the gripper body to move slightly apart, e.g. by half a millimeter, just enough to lock the at least one pin element, due to the fact that the contact edge formed either in the second portion of the gripper body or in a component inside the gripper body is inserted into the circumferential groove of the pin element.

The gripper can be also easily disassembled: the two portions of the gripper body have only to be brought back in abutment against each other, by overcoming the thrust exerted by the preloading elastic means, realigning the holes that define the pin element seats, and releasing the contact edge formed either in the second portion of the gripper body or in a component inside the gripper body from the circumferential groove of the at least one pin element. At this time, the at least one pin element can be easily pulled out by applying a thrust parallel to the pin elements themselves, and the two portions of the gripper body can be separated from each other.

Preferably, the actuator device comprises a single-acting pneumatic piston with return spring.

Pneumatic pistons, particularly the single-acting type with return spring, are a particularly suitable choice when structural simplicity and cost-effectiveness of the gripper must be favored.

In this case, conveniently, the gripper is designed so that the preloading elastic means provided in the gripper body in order to generate a preloading force between the two portions of the gripper body as described above coincide with the return spring of the pneumatic piston. Advantageously, this choice helps to reduce the number of gripper components.

In a preferred embodiment, the at least one movable jaw can be linearly translated. In other words, in this case the gripper is designed as a linear gripper.

In this embodiment, the gripper preferably comprises at least one transmission element operatively interposed between the at least one movable jaw and the actuator device.

The transmission element is preferably designed as a rocker lever that can be pivoted around the at least one pin element and has a first arm intended to engage the actuator device and a second arm intended to engage the at least one movable jaw.

Preferably, the rocker lever is pivotably supported on a supporting element mounted on a rod of the pneumatic piston so as to be able to axially translate with respect to the rod itself, and the return spring of the pneumatic piston is mounted around the rod between a head of the pneumatic piston and the supporting element.

A so designed transmission conveniently combines a simple structure consisting of a minimum number of elements and easy to be assembled, with robust and reliable operation.

In another preferred embodiment, the at least one movable jaw can be pivoted. In other words, in this case the gripper is designed as an angular gripper.

In this embodiment, the at least one movable jaw is preferably directly actuated by the actuator device of the gripper, preferably again a single-acting pneumatic piston with return spring.

In particular, the pneumatic piston preferably comprises a rod having an actuating end provided with at least one inclined surface intended to tangentially cooperate with a contact portion of the at least one movable jaw in order to cause the latter to pivot around a pivot axis defined by the aforesaid pin element.

Preferably, the return spring of the pneumatic piston is mounted coaxially to a rod of the pneumatic piston, between a head of the pneumatic piston and an abutment portion of the second portion of the gripper body.

Again, such a configuration gives the gripper both a particularly simple structure consisting of a minimum number of components and easy to be assembled, and robust and reliable operation.

BRIEF DESCRIPTION OF THE DRAWINGS

Further characteristics and advantages of the invention will be more evident from the review of the following specification of preferred, but not exclusive, embodiments of the invention, depicted for illustration purposes only and without limitation, with the aid of the attached drawings, wherein.

DETAILED DESCRIPTION OF THE PREFERRED EMBODIMENTS

Figure 1:
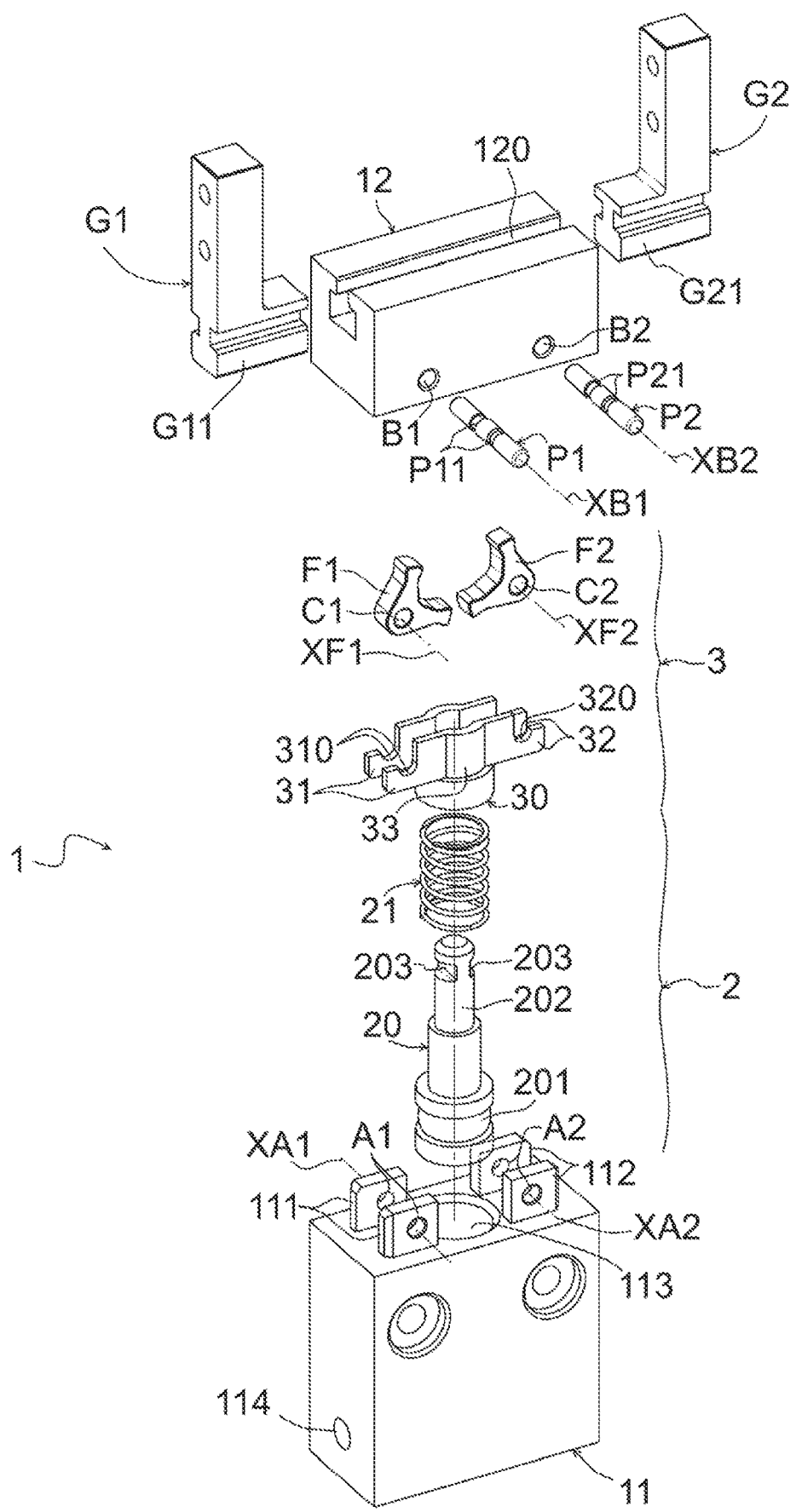
FIG. 1 schematically shows an exploded perspective view of a first embodiment of a gripper for industrial manipulators according to the invention.

FIGS. 1-4 show a first preferred embodiment of a gripper for industrial manipulators according to the invention, generally denoted by the numerical reference 1.

The gripper 1 comprises a gripper body 10 and a pair of jaws, or gripping fingers, G1, G2.

The jaws G1, G2 are both movable away from or closer to each other with respect to gripper body 10, in order to cause the gripper 1 to be opened and closed, respectively.

In particular, in the embodiment shown in FIGS. 1-4 the gripper 1 is designed as a linear gripper with parallel jaws. Therefore, the movements carried out by the jaws G1, G2 are linear and parallel to each other.

In this case the gripper body 10 has a general parallelepiped shape and comprises two portions 11, 12 which can be removably assembled to each other. A first portion 11 is mainly designed to house an actuator device 2 of the gripper 1, described in more detail below, and to allow the coupling of the gripper 1 to a respective manipulator (not shown as it is not part of the invention), while a second portion 12 is mainly designed to movably support the two jaws G1, G2.

In particular, the first portion 11 of the gripper body 10, whose shape is generically parallelepiped and preferably monolithic, is provided with a housing seat 113 to house the actuator device 2. The housing seat 113 is open outwards at one face of the first portion 11 intended to be coupled to the second portion 12 of the gripper body 10.

The second portion 12 of the gripper body 10, also having generally parallelepiped and preferably monolithic shape, is provided with a guide rail 120 in which respective guide portions G11, G21 of the jaws G1 and G2 are slidingly received by shape coupling. A face of the second portion 12 of the gripper body 10, opposite the one provided in the guide rail 120, is intended to be coupled with the first portion 11 of the gripper body 10. This coupling face has a cavity 121, only partially visible in the views of the FIGS. 2 and 4, which is designed and sized to house a transmission unit 3 operatively interposed between the actuator device 2 and the two jaws G1, G2 and described in more detail below. The cavity 121 has a bottom wall with at least one opening exhibiting the guide portions G11, G21 of the jaws G1, G2, so that the latter can be operationally connected to the transmission unit 3.

Figure 2:
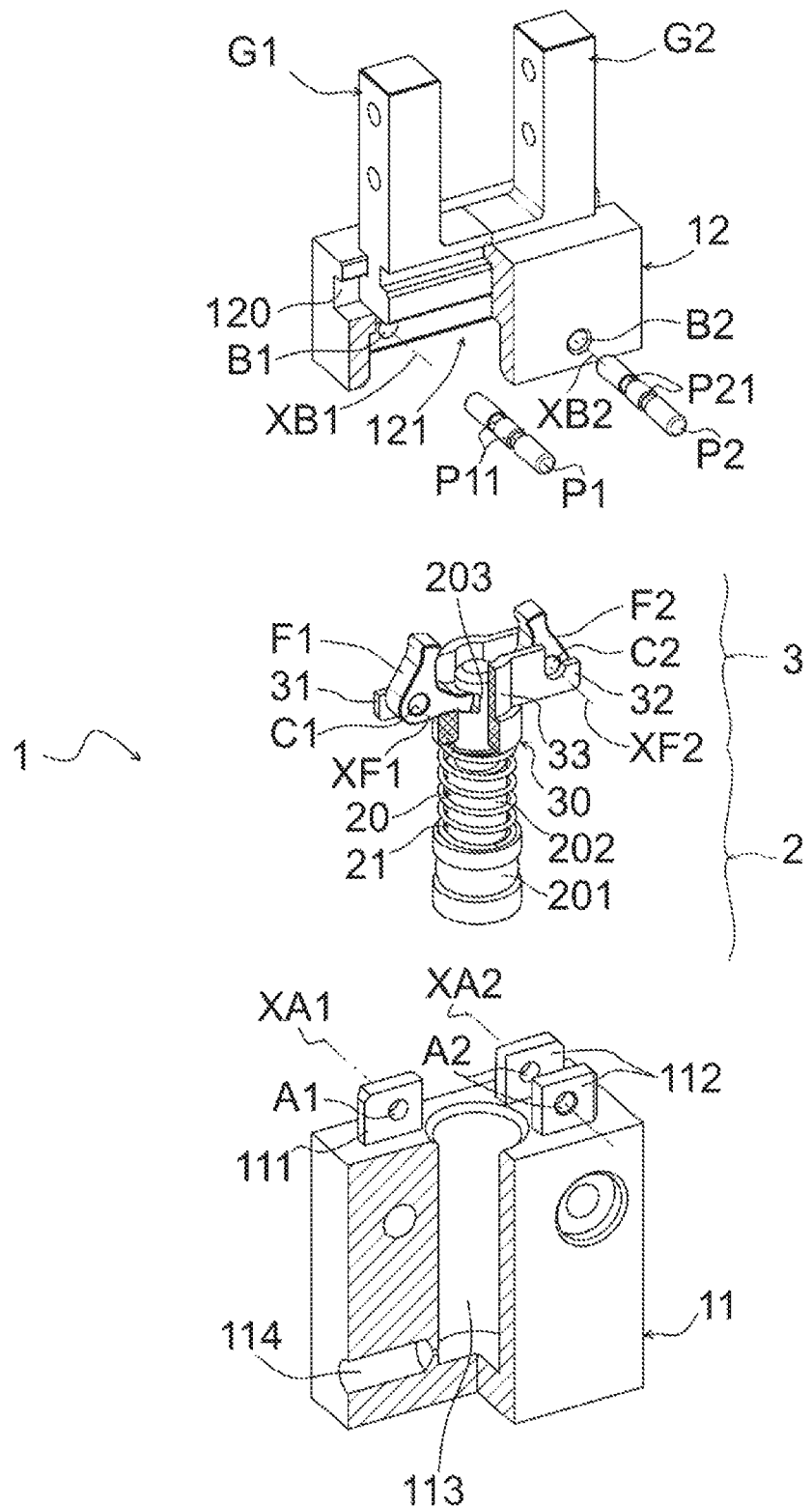
FIG. 2 schematically shows a partially sectional and exploded perspective view of the gripper of FIG. 1, in a partially assembled condition.
Figure 3:
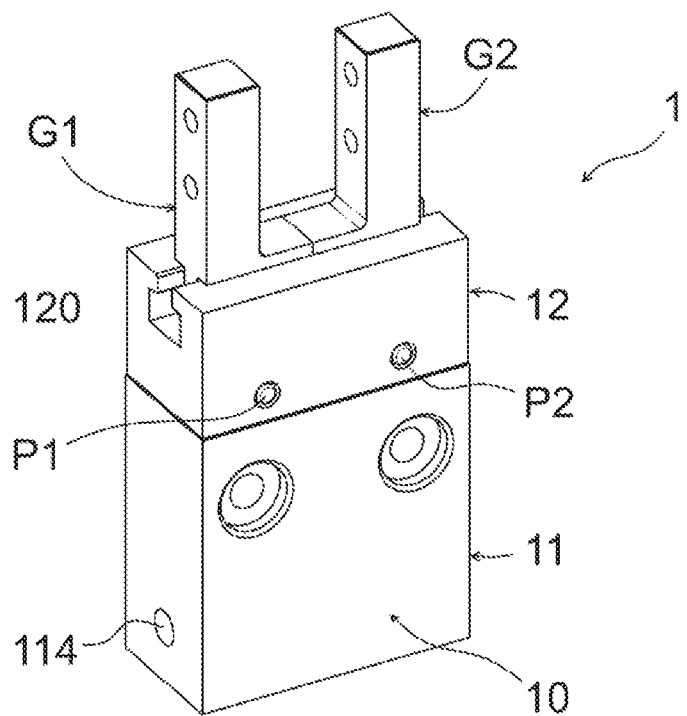
FIG. 3 schematically shows a perspective view of the gripper of FIG. 1 in a fully assembled condition.
Figure 4:
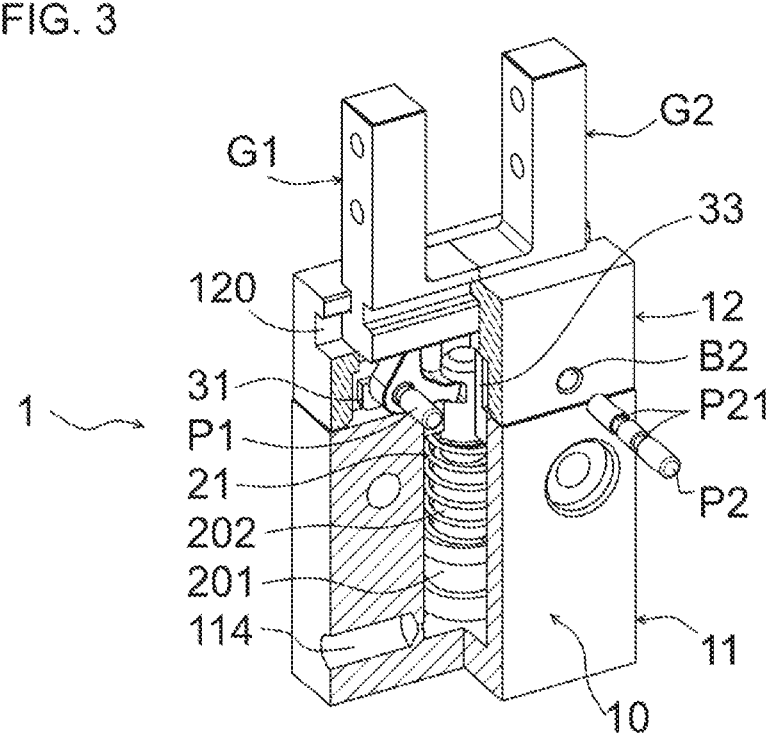
FIG. 4 schematically shows a partially sectional perspective view of the gripper of FIG. 1 in a fully assembled condition.

As can be seen in particular in FIGS. 1 and 2, in order to allow the first and second portions 11, 12 of the gripper body 10 to be firmly locked in an assembled condition, two pairs of fins 111, 112, respectively, are formed on the coupling face of the first portion 11 and project from the coupling face and are each provided with a through-hole A1 or A2. The through-holes A1 of the pair of fins 111 are aligned with each other, i.e. they have a common central axis XA1; similarly, the through-holes A2 of the pair of fins 112 are aligned with each other, i.e. they have a common central axis XA2. The central axes XA1 and XA2 of the pairs of through-holes A1, A2 are parallel to each other and to the surface of the coupling face 110, as well as perpendicular to the extending direction of the guide rail 120 in the second portion 12 of the gripper body 10.

Correspondingly, two through-holes B1, B2 with respective central axes XB1, XB2 parallel to each other and perpendicular to the extending direction of the guide rail 120 are formed in the second portion 12 of the gripper body 10.

When the gripper 1 is assembled (see FIGS. 3 and 4), the first and second portions 11, 12 of the gripper body 10 are coupled together so that the pairs of fins 111, 112 of the first portion 11 are received in the cavity 121 of the second portion 12, and the pairs of through-holes A1, A2 of the first portion 11 are aligned or can be aligned with the through-holes B1, B2 of the second portion 12, respectively, i.e. the central axes XA1, XA2 coincide or can be made to coincide with the central axes XB1, XB2, respectively. This allows two respective pin elements P1, P2 to be inserted into the aforesaid holes in order to firmly lock together the first and second portions 11, 12 of the gripper body 10.

As previously mentioned, the actuator device 2, which in the preferred embodiments of the gripper 1 illustrated herein consists of a single-acting pneumatic piston 20 with return spring 21, is housed inside the gripper body 10.

The piston 20 is housed in the respective housing seat 113 provided in the first portion 11 of the gripper body 10 so as to be axially movable therein and comprises a head 201 and a rod 202. The return spring 21 is coaxially mounted around the rod 202, between the head 201 of the piston 20 and the transmission unit 3. A supply line 114 formed in the first portion 11 of the gripper body 10 allows compressed air to be injected into the housing seat 113, in the area between a closed bottom wall thereof and the head 201 of the piston 20.

With such a configuration, the active stroke of the piston 20, resulting from the supply of compressed air in the housing seat 113, causes the jaws G1, G2 to move away from each other, i.e. the gripper 1 to be opened, whereas the return stroke of the piston 20, due to the action of the return spring 21 when the compressed air supply stops, causes jaws G1, G2 to move closer to each other, i.e. the gripper 1 to be closed. In the absence of compressed air supply, therefore, the return spring 21 of the piston 20 keeps the gripper 1 in a closed or gripping condition.

As above mentioned, in the embodiment shown in FIGS. 1-4 the gripper also comprises a transmission unit 3 operationally interposed between the actuator device 2 and the jaws G1, G2. Preferably, the transmission unit 3 comprises a pair of rocker levers F1, F2 pivotably supported on a common supporting element 30.

Each rocker lever F1, F2 has a first arm intended to engage with the actuator device 2 and a second arm intended to engage with one of the jaws G1, G2. In particular, the first arms of the rocker levers F1, F2 are freely engaged in corresponding transverse grooves 203 obtained in the rod 202 of the piston 20 at an end thereof opposite the end carrying the head 201 (see FIGS. 2 and 4). The second arms of the rocker levers F1, F2 are freely engaged in corresponding seats (not visible in the views shown in the figures) formed in the guide portions G11, G21 of the jaws G1, G2, which can be accessed through the at least one opening obtained in the bottom wall of the cavity 121 of the second portion 12 of the gripper body 10.

The rocker levers F1, F2 each have a through-hole C1, C2 for inserting a pin element P1, P2, the latter defining a pivot axis XF1, XF2 of the respective rocker lever F1, F2 (see FIGS. 1 and 2).

The gripper 1 of the present invention is advantageously designed so that, in the assembled condition, the through-hole C1 of the rocker lever F1 is aligned with the pair of through-holes A1 in the pair of fins 111 of the first portion 11 of the gripper body 10 and with the through-hole B1 in the second portion 12 of the gripper body 10, and that the through-hole C2 of the rocker lever F2 is aligned with the through-holes A2 in the pair of fins 112 of the first portion 11 of the gripper body 10 and with the through-hole B2 in the second portion 12 of the gripper body 10. In other words, in the assembled condition, the pivot axis XF1 of the rocker lever F1 coincides with the central axes XA1 and XB1 of the pairs of through-holes A1 and of the through-hole B1, respectively, and the pivot axis XF2 of the rocker lever F2 coincides with the central axes XA2 and XB2 of the pairs of through-holes A2 and of the through-hole B2, respectively. Thanks to this configuration, the same pin elements P1, P2 can be used both as pivot pins for the rocker levers F1, F2 and as locking pins for the two portions 11, 12 of the gripper body 10, thus avoiding the prearrangement and assembling of two separate sets of pin elements to carry out these functions.

As shown in particular in the FIGS. 1 and 2, the supporting element 30 of the rocker levers F1, F2 comprises an annular body 33 provided with two transversely opposite pairs of supporting wings 31, 32, which extend perpendicularly with respect to a longitudinal axis of the central body 33. Each supporting wing 31 or 32 has a notch 310 or 320 to receive the pin elements P1, P2 in a freely rotatable manner.

In the assembled condition, the supporting element 30 is mounted coaxially to the rod 202 of the piston 20 so as to be axially movable with respect to it, and is interposed between the return spring 21 of the piston 20 and the second portion 12 of the gripper body 10, coming into abutment with the latter at the bottom wall of the cavity 121.

Thanks to this arrangement, the return spring 21 of the piston 20 can also be used as a preloading spring acting between the two portions 11, 12 of the gripper body 10, and in particular between the portion 11 and the supporting element 30. In particular, the gripper 1 can be designed so that, in the assembled condition, the return spring 21 is partially compressed and thus generates, even statically, a preloading elastic force perpendicular to the pivot axes XF1, XF2 of the rocker levers F1, F2, the force urging the supporting element 30 of the transmission unit 3 and, as a result, the second portion 12 of the gripper body 10 to move away from the first portion 11 of the gripper body 10.

This preloading elastic force can be advantageously exploited for an undercut coupling between the pin elements P1, P2 and the gripper 1. This undercut coupling locks the pin elements P1, P2 in place in their seats formed by the through-holes A1, B1, C1 and the through-holes A2, B2, C2, respectively.

For this purpose, the pin elements P1, P2 comprise a pair of circumferential grooves P11, P21 respectively, which are intended to engage corresponding contact edges defined in the gripper body 10 or in components inside the latter, in particular herein with the notches 310, 320 of the pairs of supporting wing 31, 32 of the supporting element 30 of the rocker levers F1, F2, so as to create an undercut. When the pin elements P1, P2 are fully inserted into the gripper body 10, the respective pairs of circumferential grooves P11, P21 are axially located at the grooves 310, 320, and the preloading elastic force generated by the return spring 21 pushes edge portions of these notches 310, 320 into the grooves P11, P21 and keep them firmly engaged with the grooves P11, P21 themselves.

The gripper 1 with the above described structure can be assembled in a particularly easy and fast way without requiring assembling tools.

First of all, all the components of the gripper 1, except the pin elements, P1, P2, are assembled together, in particular stacked on top of each other. Subsequently, the first and second portions 11, 12 of the gripper body 10 are pressed together manually so that the respective coupling surfaces are brought into abutment with each other. In this condition the through-holes A1, B1, C1 and A2, B2, C2 are aligned. In addition, the return spring 21 of the piston 20 is partially compressed and generates a preloading force that forces the first and second portions 11, 12 of the gripper body 10 to move away from each other and the supporting element 30 of the lever arms F1, F2 to move towards the second portion 12. At this point, the pin elements P1, P2 are manually inserted into the through-holes A1, B1, C1 and A2, B2, C2 respectively, thereby obtaining at the same time that the rocker levers F1, F2 are pivotally supported in the gripper body 10 and that the first and second portions 11, 12 of the gripper body 10 are locked together. When the pin elements P1, P2 are fully inserted into the gripper body 10, the preloading force acting on the supporting element 30 of the rocker levers F1, F2 automatically snaps the pairs of notches 310, 320 of the supporting wings 31, 32 into the pairs of circumferential grooves P11, P21 of the pin elements P1, P2, respectively, the latter being thus firmly locked in position.

The gripper can be disassembled by applying a thrust on the supporting element 30, with a tool, after the jaws have been opened up, counteracting the thrust of the spring 21, so as to align the holes 111-B1, 112-B2 and pull out the pin elements P1, P2.

Figure 5:
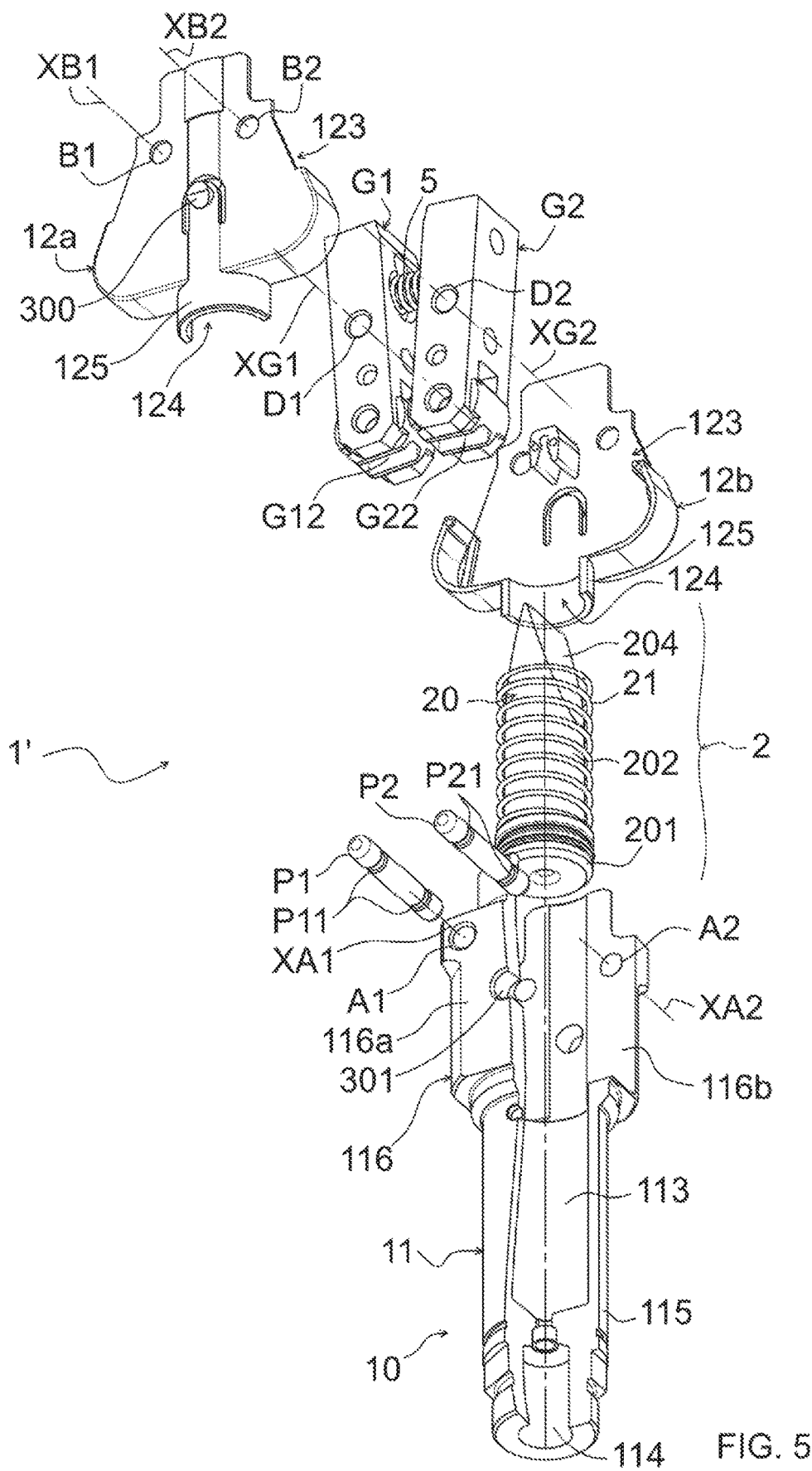
FIG. 5 schematically shows a partially sectional and exploded perspective view of a second embodiment of a gripper for industrial manipulators according to the invention, in a partially assembled condition.
Figure 6:
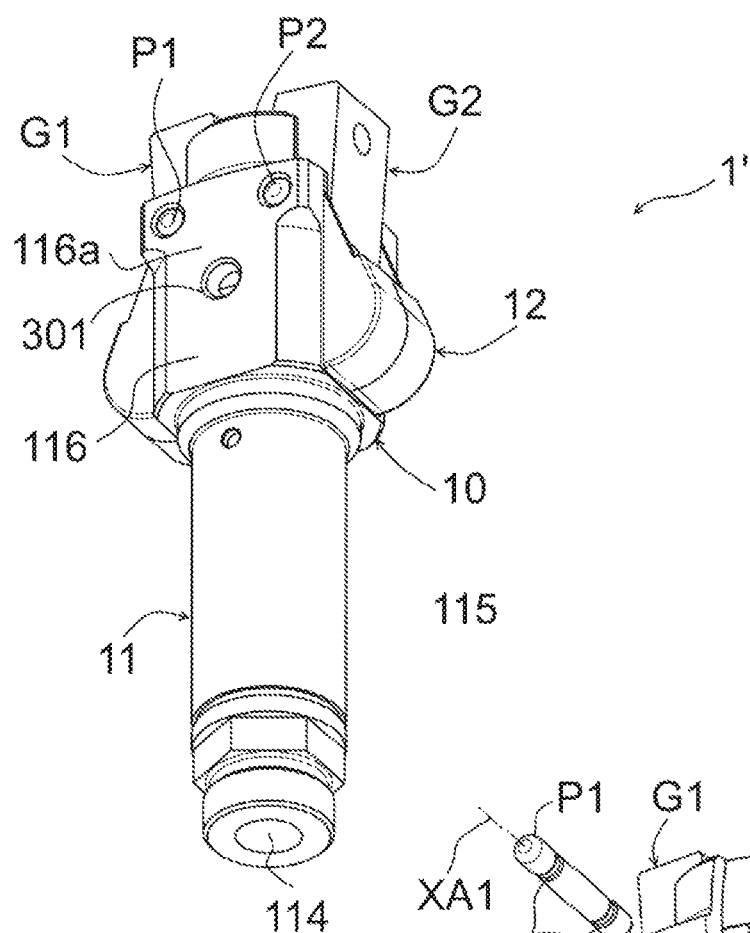
FIG. 6 schematically shows a schematic perspective view of the gripper of FIG. 5 in a fully assembled condition, and FIG. 7 schematically shows a partially sectional schematic perspective view of the gripper of FIG. 5 in fully assembled condition.
Figure 7:
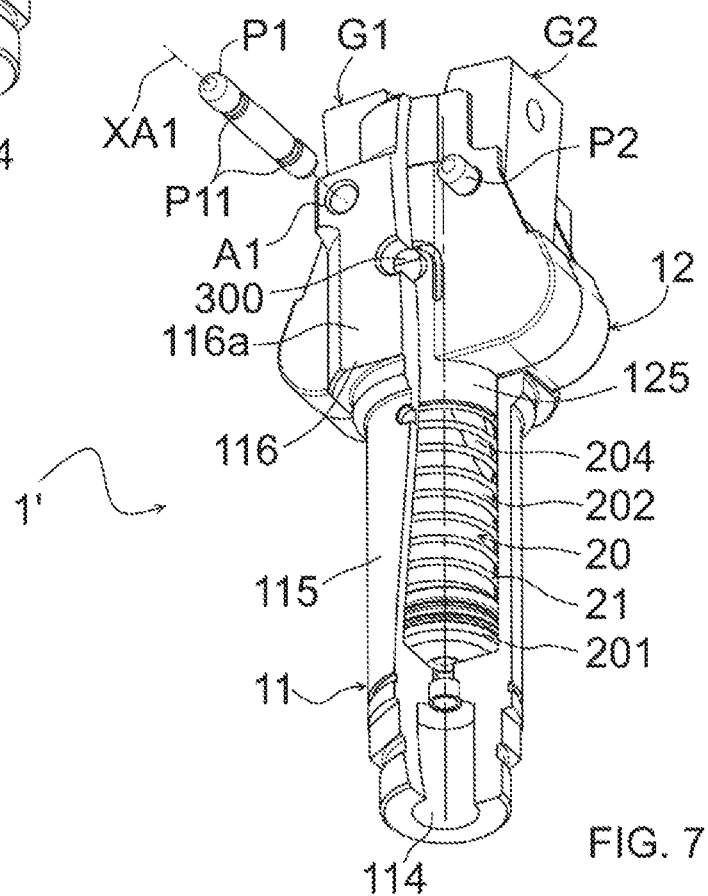

FIGS. 5-7 show a second preferred embodiment of the gripper 1' for industrial manipulators according to the invention. In these figures, elements structurally or functionally similar to elements of the first embodiment illustrated above are denoted by the same numerical references and are described in detail below only to the extent that they differ from those described in relation to the first embodiment.

In particular, the gripper 1' shown in FIGS. 5-7 is designed as angular gripper, in which the two movable jaws G1, G2 can be pivoted with respect to the gripper body 10.

The gripper body 10 comprises also in this case two portions 11, 12 that can be removably assembled together, wherein a first portion 11 is mainly designed to house the actuator device 2 of the gripper 1' and to allow the gripper 1' to be coupled to a respective manipulator (not shown as it is not part of the invention), while a second portion 12 is mainly designed to support the two jaws G1, G2.

The first portion 11 of the gripper body 10, preferably having monolithic structure, comprises a generally elongated and cylindrical body 115 with a fork-shaped head 116 at one end to be removably coupled with the second portion 12 of the gripper body 10. The fork-shaped head 116 is formed by two stems 116a, 116b having generally flattened shape and being parallel to each other (see FIG. 5) and allowing at least part of the second portion 12 of the gripper body 10 to be accommodated between them (see FIGS. 6 and 7). A housing seat 113 for an actuator device 2 of the gripper 1' is obtained inside the gripper body 115 and is open to the outside at the aforementioned fork-shaped head 116.

The second portion 12 of the gripper body 10 has a flattened configuration, whose thickness allows it to be inserted freely, but preferably without clearances, between the two stems 116a, 116b of the fork-shaped head 116 of the first portion 11 (see FIGS. 5, 6). Preferably, the second portion 12, in front view, has a general lance or heart shape, which provides the space required for the pivoting movements of the jaws G1, G2 and at the same time minimizes the transverse dimensions of the gripper 1'. Moreover, in this case, to facilitate the assembly of the jaws G1, G2, the second portion 12 is preferably formed by two half-shells 12a, 12b that can be assembled together.

In particular, the second portion 12 has two opposite front walls substantially flat, only one of them being visible in the views of the FIGS. 5-7, the two parts being joined at least in some perimeter lengths by a side wall. As can be seen in particular in FIG. 5, the side wall is disjointed by two openings 123, 124, which are provided on one side so as to eject the jaws G1, G2 from the second portion 12 of the gripper body 10, and on the other side to allow the jaws G1, G2 to be operationally coupled with the actuator device 2 housed in the first portion 11 of the gripper body 10, respectively.

The jaws G1, G2 are pivotably mounted in the second portion 12 of the gripper body 10 by means of pin elements P1, P2, which define respective pivot axes XG1, XG2 of the jaws G1, G2. In particular, each pin element P1, P2 can be freely inserted in a respective through-hole D1, D2 formed in the jaws G1, G2 and in correspondingly formed pairs of through-holes B1, B2 in the front walls of the second portion 12 of the gripper body 10.

The first portion 11 of the gripper body 10 is provided, at the stems 116a, 116b of the fork-shaped head 116, with pairs of through-holes A1, A2 having respective central axes XA1, XA2.

Also in this embodiment, the gripper FR is designed so that, in the assembled condition, the pairs of through-holes A1, A2 of the first portion 11 of the gripper body 10 are aligned or can be aligned with the pairs of through-holes B1, B2 of the second portion 12 of the gripper body 10, respectively, and therefore with the through-holes D1, D2 of the jaws G1, G2. In other words, in the assembled condition, the pivot axes XG1, XG2 of the jaws G1, G2 coincide or can be made to coincide with the central axes XA1, XA2 of the pairs of through-holes A1, A2. Therefore, even this case, the same pin elements P1, P2 can be advantageously used both as pivot pins, here for the jaws G1, G2, and as locking pins for the two portions 11, 12 of the gripper body 10.

As in the first embodiment of the gripper 1 described above, the actuator device 2 consists of a single-acting pneumatic piston 20 with return spring 21, movably housed in the respective housing seat 113 of the first portion 11 of the gripper body 10. The return spring 21 is coaxially mounted around the rod 202 of the piston 20, but in this case, since there is no transmission unit between the actuator device 2 and the jaws G1, G2, it is interposed between the head 201 of the piston 20 and an abutment portion 125 of the second portion 12 of the gripper body 10, here defined by a collar extended around the opening 124 and having transverse dimensions such that it can be inserted into the housing seat 113 of the piston 20.

In the embodiment 1' of FIGS. 5-7, the actuator device 2 acts on the jaws G1, G2 directly, without interposition of a transmission unit. The end of the rod 202 of the piston 20, opposite the one carrying the head 201, is in this case designed as a wedge-shaped actuating end 204 formed by two flat counter-inclined surfaces, which are diametrically opposed, and is intended to be inserted between special contact portions G12, G22, facing each other and suitably shaped, of the jaws G1, G2, so as to cause them to pivot (FIG. 5).

The operating principle of the gripper 1' is similar to the one described above with reference to the embodiment 1 in FIGS. 1-4. The active stroke of the piston 20, resulting from the supply of compressed air into the housing seat 113, pushes the actuating end 204 of the rod 202 between the two contact portions G12, G22 of the jaws G1, G3, thereby causing them to pivot away from each other, i.e. the gripper 1' to be closed for gripping the workpiece. The return stroke of the piston 20, due to the action of the return spring 21 when the compressed air supply is stopped, disengages the actuating end 204 of the rod 202 with respect to the jaws G1, G2. In this condition the jaws G1, G2 pivot closer to each other, thereby causing the gripper 1' to open up, due to an elastic return force generated by a compression spring 5, or by other equivalent elastic means, operationally interposed between the jaws G1, G2 themselves (FIG. 5). When the piston 20 is not actuated, the compression spring 5 keeps the gripper 1' in an open condition in which the workpiece is released.

Also, in this embodiment the return spring 21 of the piston 20 can simultaneously function as a preloading spring acting between the two portions 11, 12 of the gripper body 10. In particular, the gripper 1' can be designed so that, in the assembled condition, the return spring 21 is partially compressed, thereby also statically generating a preloading elastic force perpendicular to the pivot axes XG1, XG2 of the jaws G1, G2. This preloading elastic force can also be advantageously used to lock the pin elements P1, P2 in place when they are fully inserted into the gripper body 10. In this condition, the respective pairs of circumferential grooves P11, P21 of the pin elements P1, P2 are located axially at the pairs of through-holes B1, B2 of the second portion 12 of the gripper body 10 and the preloading elastic force generated by the return spring 21 automatically pushes edge portions of these through-holes B1, B2 into the grooves P11, P21. An undercut that locks the pin elements P1, P2 axially in position is thus created.

The assembling of this second embodiment of the gripper 1' is basically the same as described above with reference to the first embodiment 1.

In particular, for the assembling, first of all the components of the gripper 1' are assembled together. Next, the first and second portions 11, 12 of the gripper body 10 are pressed together manually so that the side wall of the second portion 12 of the gripper body 10, which is inserted into the fork-shaped head 116 of the first portion 11 of the gripper body 10, is brought into abutment against a bottom portion of the fork-shaped head 116 itself. In this condition, the pairs of through-holes A1, A2 of the first portion 11 of the gripper body 10 are aligned with the pairs of through-holes B1, B2 of the second portion 12 of the gripper body 10, respectively, which, in turn, are aligned with the through-holes D1, D2 of the jaws G1, G2, respectively, and the return spring 21 of the piston 20 is partially compressed, thereby generating the preloading force that forces the first and second portions 11, 12 of the gripper body 10 to move away from each other. At this point, the pin elements P1, P2 are manually inserted into the through-holes A1, B1, D1 and A2, B2, D2 respectively, thereby obtaining at the same time that the jaws G1, G2 are pivotally supported in the gripper body 10 and that the first and second portions 11, 12 of the gripper body 10 are locked together. When the pin elements P1, P2 are fully inserted into the gripper body 10, the preloading force acting between the two portions 11, 12 of the gripper body 10 automatically snaps edge portions of the through-holes B1, B2 into the grooves P11, P21, thereby locking them firmly in position.

In order to prevent accidental disengagement, the gripper 1' is provided, on at least one of the two half-shells 12a, 12b of the second portion 12 and preferably on both of them, with projections 300 that snap into corresponding holes 301 that are on the fork-shaped head 116 of the body 115 when the gripper 1' is assembled. In particular, the projections 300 are positioned on flexible portions of the respective half-shells 12a, 12b; therefore, during the assembly of the various components of the gripper 1', the portions provided with the projections 300 flex, thereby allowing the insertion of the portion 12 into the portion 11, up to the point where the projections 300 intercept the respective holes 301, snapping into the latter and accomplishing the coupling. To achieve the disassembly, a pressure must be simply applied on the flexible portions by means of a tool, so as to remove the projections 300 from the holes 301 and proceed as described above.

Therefore, the invention provides a gripper 1, 1' for industrial manipulators, consisting of a reduced number of components and able to be assembled quickly and easily, that therefore can be manufactured at lower costs.

The invention claimed is:

1. A gripper for industrial manipulators, comprising:
   at least two jaws, at least one of the at least two jaws being movable in order to cause the gripper to be opened and closed;
   a gripper body comprising two portions which is configured to be removably assembled to each other, wherein a first portion is configured to at least partially house an actuator device of the gripper and a second portion is configured to support the at least two jaws, and
   at least one pin element, which
   defines a pivot axis of the at least one movable jaw, or
   defines a pivot axis of at least one transmission unit operatively interposed between the at least one movable jaw and the actuator device,
   wherein said at least one pin element also acts as a locking pin to lock together the first portion and the second portion of the gripper body in assembled condition,
   wherein said at least one pin element has at least one circumferential groove and wherein, in an assembled condition of the gripper, the at least one circumferential groove engages a contact edge formed either in the second portion of the gripper body or in a supporting element of the at least one transmission unit,
   under the action of a preloading elastic force acting perpendicularly to the said pivot axes and generated by preloading elastic means prearranged in the gripper body so as to force the first portion and the second portion of the gripper body to reciprocally move away from each other.

2. The gripper according to claim 1, wherein in an assembled condition of the gripper said at least one pin element forms an undercut with at least one of the two portions of the gripper body or with a component housed inside the gripper body.

3. The gripper according to claim 1, wherein the first portion of the gripper body comprises at least one first through-hole having a respective central axis and the second portion of the gripper body comprises at least one second through-hole having a respective central axis, and wherein in an assembled condition of the first portion and the second portion of the gripper body, said central axes of the at least one first through-hole and at least one second through-hole are configured to be aligned with each other and with one of said pivot axes.

4. The gripper according to claim 1, wherein the actuator device comprises a single-acting pneumatic piston with return spring.

5. The gripper according to claim 4, wherein said preloading elastic means are constituted by the return spring of the pneumatic piston.

6. The gripper according to claim 4, wherein the at least one movable jaw is configured to be linearly translated.

7. The gripper according to claim 6, wherein the gripper comprises the at least one transmission unit operatively interposed between at least one movable jaw and the actuator device, wherein the at least one transmission unit is designed as a rocker lever that is configured to be pivoted around said at least one pin element and has a first arm configured to engage the actuator device and a second arm configured to engage the at least one movable jaw.

8. The gripper according to claim 7, wherein said rocker lever is pivotably supported on a supporting element mounted on a rod of the pneumatic piston so as to be axially movable with respect to the rod itself, and wherein the return spring of the pneumatic piston is mounted around the rod between a head of the pneumatic piston and the supporting element.

9. The gripper according claim 4, wherein the at least one movable jaw is configured to be pivoted.

10. The gripper according to claim 9, wherein the pneumatic piston comprises a rod having an actuating end provided with at least one inclined surface configured to tangentially cooperate with a contact portion of the at least one movable jaw in order to cause said at least one movable jaw to pivot.

11. The gripper according to claim 10, wherein the return spring of the pneumatic piston is mounted around a rod of the pneumatic piston, between a head of the pneumatic piston and an abutment portion of the second portion of the gripper body.

* * * * *